United States Patent Office 3,122,533
Patented Feb. 25, 1964

3,122,533
AZO DISPERSE DYESTUFFS OF LOW
WATER SOLUBILITY
Otto Senn, Arlesheim, Basel-Land, Switzerland, assignor to Sandoz Ltd., Basel, Switzerland
No Drawing. Filed Sept. 13, 1960, Ser. No. 55,717
Claims priority, application Switzerland Sept. 15, 1959
1 Claim. (Cl. 260—297)

This invention relates to disperse dyestuffs of low water solubility which contain at least one reactive group of the formula

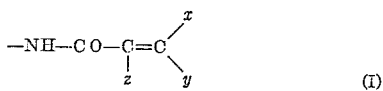
(I)

wherein:

$x$ represents hydrogen or halogen,
$y$ halogen or halogenoalkyl and
$z$ hydrogen or halogen.

The process for the production of the new disperse dyestuffs consists in reacting 1 mole of an organic dyestuff which contains at least one primary amino group, or 1 mole of an organic compound which contains at least one primary amino group plus at least one substituent capable of dyestuff formation, with at least 1 mole of a functional derivative of an acid of the formula

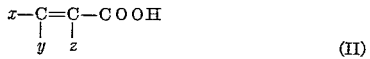
(II)

wherein $x$, $y$ and $z$ possess the aforecited meanings, whereupon the resulting reaction products, when they contain substituents capable of dyestuff formation, are converted into dyestuffs by a suitable reaction, the reactants being so chosen that the end-products are free from carboxylic acid and sulfonic acid groups.

Functional derivatives of acids corresponding to the Formula II which are of primary interest, are the chlorides of γ-chloro- and γ-bromocrotonic acid, β,β-dichloro-, β,β-dibromo-, α.β.β.-trichloro- and α.β.β-tribromocrotonic acid.

The new process is applicable with all classes of organic disperse dyestuffs which are of low water solubility. Those of primary interest for the process contain at least one amino group; examples of such dyestuffs are aminomonoazo, aminodisazo, aminopolyazo, aminostyryl, aminoanthraquinone, aminonitro and aminohydroxyquinophthalone dyestuffs. The aminomonoazo, aminodisazo and aminopolyazo dyestuffs may contain metal atoms, e.g. chromium, cobalt, nickel or copper atoms, combined by co-ordination links. Also, aminoazo dyestuffs which contain metallizable groupings can be reacted with a compound of the Formula II or III. Dyestuffs of this latter type can either be metallized in substance after condensation or reacted with the fiber in the metal-free form and the dyeings aftertreated with metal-yielding agents.

As stated above, disperse dyestuffs of low water-solubility containing at least one group of Formula I can also be produced by starting from organic compounds which possess at least one primary amino group and a substituent capable of dyestuff formation. Azo coupling plays an important part in the reaction giving the final dyestuffs. It can be carried out by reacting a compound containing at least one primary amino group plus a diazotizable amino group with a functional derivative of an acid of Formula II, diazotizing the intermediate product and coupling the diazo compound with a coupling component to give a disperse dyestuff of low water solubility, or by reacting a compound containing at least one primary amino group plus a substituent convertible into a diazotizable amino group with a functional derivative of an acid of Formula II, converting this substituent in the intermediate product into the amino group, diazotizing the amino compound and coupling the diazo compound with a coupling component, again to give a disperse dyestuff of low water solubility.

Compounds with at least one primary amino group plus a coupling carbon atom, e.g. aminohydroxy compounds, can be condensed with a functional derivative of an acid of Formula II to give an intermediate product for use as coupling component. Naturally, the diazo compound of a diazo component containing one group of Formula I can be coupled with a coupling component which likewise contains a group of Formula I.

The reaction of the compounds used as starting products or of the disperse dyestuffs of low water solubility with a functional derivative of an acid of Formula II can be carried out in aqueous suspension, in aqueous-organic suspension or solution, or in solution in an inert solvent. The functional derivative of an acid of Formula II can be employed as such in concentrated form or dissolved in an organic solvent, particularly suitable solvents being acetone, dioxane, benzene, chlorobenzene and toluene.

The reaction temperature is adapted to the reactivity of the individual starting products. If temperatures higher than about 40° C. are necessary, it is advisable to work with vessels equipped with reflux condensers in view of the volatility in steam of the functional derivative of an acid of Formula II.

The reaction in aqueous-organic or aqueous medium is carried out in the weakly alkaline, neutral to weakly acid region, preferably at pH 7 to 3. To neutralize the halogen halide formed an acid-binding agent such as sodium acetate is added to the reaction solution or suspension at the start of the reaction, or alternatively small portions of sodium or potassium carbonate or bicarbonate in solid pulverized form or in concentrated aqueous solution are added in the course of the reaction. Other suitable neutralizing agents are aqueous solutions of sodium or potassium hydroxide. The addition of small amounts of a wetting or emulsifying agent to the reaction medium can accelerate the rate of reaction.

On completion of condensation or coupling the final disperse dyestuff is isolated according to one of the following fundamental operations: filtration, evaporation of the solvent, precipitation from the solution with a suitable agent and filtration.

The disperse dyestuffs of low water solubility containing at least one group of Formula I are suitable for the dyeing, padding and printing of hydrophobic fibers and fiber blends, as well as shaped articles of these fibers, e.g. fibers or shaped articles of cellulose ethers and esters and of fully synthetic fibers such as linear polyesters, polyurethanes, polyacrylonitrile, acrylonitrile copolymers, and also mixtures of these fibers or articles, but preferably of synthetic polyamide fibers and basically modified polyacrylonitrile fibers. The dyeings and prints possess good fastness to light, perspiration, washing, milling, sublimation, pleating, heat setting and sea water.

Dyeings, padding and prints of the said dyestuffs are subjected to heat treatment either during or after the application of the dyestuffs. In the three types of application the commonly used wetting, levelling, thickening and other textile auxiliary agents can be employed, while the heat treatment is carried out to best advantage in presence of agents which combined with hydrogen halide.

Suitable dispersing agents are the condensation products of naphthalene sulfonic acid and formaldehyde and of alkyl phenols and ethylene oxide, also the esters of sulfosuccinic acid, Turkey red oil, soaps and similar agents; these are employed in the presence or absence of protective colloids such as dextrins, British gum, and water-soluble proteins.

Secondary cellulose acetate is sensitive to temperatures above 90° C. and must be dyed at 60–85° C., whilst cellulose triacetate can be dyed at 95–100° C.

The fully synthetic fibers (linear aromatic polyesters, polyamides, polyurethanes, polyacrylonitrile, polyvinyl chloride) can be dyed at 60–100° C. At temperatures above 100° C. dyeing is carried out under pressure.

The dyed fibers can be washed with warm water or with a synthetic detergent if necessary, and are then rinsed and dried. In certain cases the treatment can be carried out in one operation using an inorganic or organic base, an alkaline soap or an alkaline detergent.

The disperse dyestuffs of this invention are suitable for printing synthetic fibers with the aid of dispersing agents; for this purpose alkaline substances such as e.g. sodium bicarbonate are used. The print pastes are prepared with the normal additions such as urea, thiourea etc.

In the following examples the parts and percentages are by weight and the temperatures in degrees centigrade.

EXAMPLE 1

22.7 parts of 2-hydroxy-5-methyl-4′-amino-1,1′-azobenzene are dissolved in 200 parts of dioxane and 200 parts of water. The yellow solution formed is cooled to 0° and gradually mixed with 17 parts of γ-chlorocrotonic acid chloride in 50 parts of acetone with constant stirring. By simultaneous addition of sodium acetate a constant pH of 6 is obtained. Stirring is continued for 2 hours at 0–2°, then the mass is diluted with 500 parts of water, the precipitated dyestuff filtered off and the presscake washed and carefully dried with vacuum at 40°.

By replacing the γ-chlorocrotonic acid chloride by the equivalent amount of γ-bromocrotonic acid chloride a similar dyestuff is obtained.

The new dyestuff, which is a yellow powder and can be recrystallized from glacial acetic acid, dyes synthetic polyamide fibers such as nylon and Perlon (registered trademark) from fine aqueous dispersion in yellow shades possessing good light and wet fastness. To improve the dyestuff's dispersibility it can be previously ground in the dry state with, e.g. equal amounts of monosodium phosphate and sodium dinaphthylmethane disulfonate, or the presscake can be mixed with a suitable dispersing agent, the mixture ground in the wet state and the resulting paste carefully dried so as not to impair the enhanced dispersibility.

1 part of the dyeing preparation thus obtained is dispersed in 20 parts of water and the dispersion added to 4000 parts of water containing 4 parts of a condensation product of ethylene oxde and a fatty alcohol. 100 parts of a nylon fabric are entered, the dyebath heated to 95° and maintained at this temperature for 1 hour. The dyed fabric is removed, rinsed with water, treated for 1 hour at 100° with a solution of 0.1% soap and 0.1% sodium carbonate, rinsed again and dried. It is dyed yellow and possesses good light and washing fastness.

EXAMPLE 2

22.7 parts of 2-hydroxy-5-methyl-4′-amino-1.1′-azobenzene are dissolved at 80° in 300 parts of glacial acetic acid. After the addition of 20 parts of crystallized sodium acetate, 17 parts of β.β-dichloro-acrylic acid chloride are run in. The temperature is maintained at 80° for 5 hours and the mixture is then allowed to cool. The condensation product separates in pure form as crystals which are filtered off, washed with water and dried at 40° under vacuum. The new dyestuff melts at 170–171° and, applied according to the dyeing procedure described in the last paragraph of Example 1, it dyes synthetic polyamide fibers in yellow shades fast to light and to wet treatments.

By replacing the 17 parts of β.β-dichloroacrylic acid chloride by equivalent amounts of β.β-dibromo-acrylic acid, α.β.β-trichloro- or α.β.β-tribromo-acrylic acid chloride, similar dyestuffs are obtained.

EXAMPLE 3

20.5 parts of 1-amino-2-chloro-4-methylsufonylbenzene are introduced at 15–20° into a nitrosulfuric acid prepared from 100 parts of concentrated sulfuric acid and 7 parts of sodium nitrite. The solution is stirred for 4 hours at 20° and then poured onto 350 parts of water and 600 parts of ice. A small excess of nitrous acid is destroyed by adding amidosulfonic acid.

To this mixture a solution of 27.2 parts of N-ethyl-N-[2′-(β.β - dichloro) - acrylylaminoethyl] - aminobenzene in 15 parts of concentrated hydrochloric acid, 15 parts of ice and 50 parts of water is added. The dyestuff formed precipitates immediately, it is filtered off, washed with water and dried at 40° under vacuum. It is an orange powder which dyes synthetic polyamide fibers from aqueous dispersions in orange shades fast to light and to wet treatments. The same dyestuff is also obtained by coupling the above described diazo compound with N-ethyl-N-2′-aminoethylamino-benzene and acylating the intermediate product with β.β-dichloroacrylic acid chloride.

The N-ethyl-N-[2′-(β.β-dichloro)-acrylylaminoethyl]-aminobenzene can be produced in the following manner: 16.4 parts of N-ethyl-N-2′-aminoethylamino-benzene are dissolved at room temperature in 400 parts of acetone. After the addition of 17.5 parts of β.β-dichloro-acrylic acid chloride, the mixture is heated to the boil under reflux and an aqueous solution of 15 parts of crystallized sodium acetate is dropped in. When the acylation is completed, the acetone is evaporated under reduced pressure. The residue can be employed for the coupling reaction after addition of hydrochloric acid and ice, without further processing or the acylated compound can be isolated in known manner from the aqueous suspension.

By replacing the N-ethyl-N-[2′-(β.β-dichloro)-acrylylamino-ethyl]-aminobenzene by the equivalent amounts of N-ethyl-N-[2′-(β.β-dibromo)- or -(α.β.β-trichloro)- or -(α.β.β-tribromo)-acrylylamino - ethyl] - aminobenzene, similar dyestuffs are obtained.

The following table contains further disperse dyestuffs bearing a reactive grouping of the Formula I and the shades of the dyeings on synthetic polyamide fibers.

Table

| 4 | OH-substituted phenyl—N=N—(CH₃O-substituted phenyl)—NH—CO—CH=C(H)(CH₂—Cl), with CH₃ on first ring | yellow. |

*Table*—Continued

| | Structure | Color |
|---|---|---|
| 5 | Ar(Cl)–N=N–Ar(NH–CO–CH₃)–NH–CO–CH=C(Cl)(Cl) | Yellow. |
| 6 | Pyrazolone–CH(=N–NH–CO)–N=N–Ar(O₂N)–NH–CO–CH=CH–CH₂–Br | Do. |
| 7 | Ph–N=N–Ar(OCH₃)(CH₃)–N=N–Ar(CH₃)–NH–CO–CCl=CCl | orange. |
| 8 | Ph–N=N–Ar(O–CH₃)(H₃C–O)–N=N–Ar(CH₃)–NH–CO–CH=C(Cl)(Cl) | Do. |
| 9 | H₃C–O₂S–Ar(Cl)–N=N–Ar(CH₃)–N(C₂H₅)(CH₂–CH₂–NH–CO–CH=CH–CH₂–Br) | Do. |
| 10 | H₃C–O₂S–Naphthyl–N=N–Ar–N(C₂H₄–CN)(CH₂–CH₂–NH–CO–CH=CH–CH₂Cl) | scarlet. |
| 11 | H₃C–O₂S–Ar(CN)–N=N–Ar(NH–CO–CH=CH–CH₂–Cl)–N(CH₂–CH₂–OH)(CH₂–CH₂–OH) | red. |
| 12 | Anthraquinone(NH–CH₃)(NH–CH₂–CH₂–NH–CO–CH=CH–CH₂–Cl) | blue. |
| 13 | Dihydroxyanthraquinone(NH–CH₂–CH₂–OH)(NH–CH₂–CH₂–NH–CO–CH=C(Cl)(Cl)) | blue-green. |
| 14 | Hydroxyanthraquinone–NH–Ar–CH₂–CH₂–NH–CO–C(Cl)=C(Cl)(Cl) | violet. |
| 15 | Ph–NH–O₂S–Ar(NO₂)–NH–Ar–O–CH₂–CH₂–NH–CO–CH=CH–CH₂Cl | yellow. |

EXAMPLE 16

Dyestuff 8 of the table is dyed by the dyeing method described in Example 1 to give an orange dyeing with the same good light and washing fastness.

EXAMPLE 17

A printing paste is made with 10 parts of a 7.5% aqueous dispersion of dyestuff No. 13 of the table, 41 parts of water, 2 parts of an aqueous solution of sulfonated pine oil and sperm oil, 1 part of sodium 3-nitrobenzene-1-sulfonate, 5 parts of 50% aqueous ethanol solution, 40 parts of 5% sodium alginate solution and 1 part of sodium bicarbonate.

A fabric of secondary cellulose acetate is printed with the paste, dried, steamed for 30 minutes, rinsed in water, soaped at 50° in a 0.2% soap solution, rinsed again and dried. The print is of blue-green shade and possesses good light and washing fastness.

Formulae of representative dyes of the foregoing examples are as follows:

EXAMPLE 1

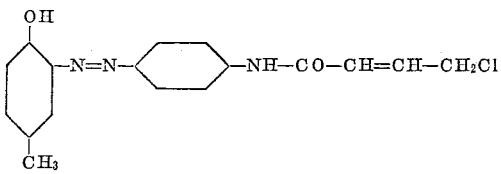

EXAMPLE 2

FIRST PARAGRAPH

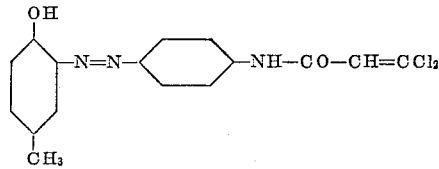

SECOND PARAGRAPH

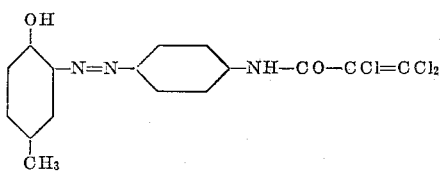

EXAMPLE 3

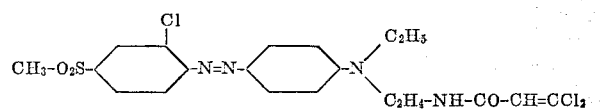

Having thus disclosed the invention what I claim is:
The dyestuff of the formula

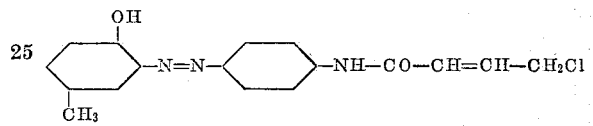

References Cited in the file of this patent

UNITED STATES PATENTS

| | | |
|---|---|---|
| 2,785,158 | Enders et al. | Mar. 12, 1957 |
| 2,864,816 | Nicolaus et al. | Dec. 16, 1958 |
| 2,972,508 | Kruckenberg et al. | Feb. 21, 1961 |

FOREIGN PATENTS

| | | |
|---|---|---|
| 963,457 | Germany | May 9, 1957 |
| 1,200,241 | France | June 29, 1959 |
| 1,205,622 | France | Aug. 17, 1959 |